Patented Apr. 23, 1935

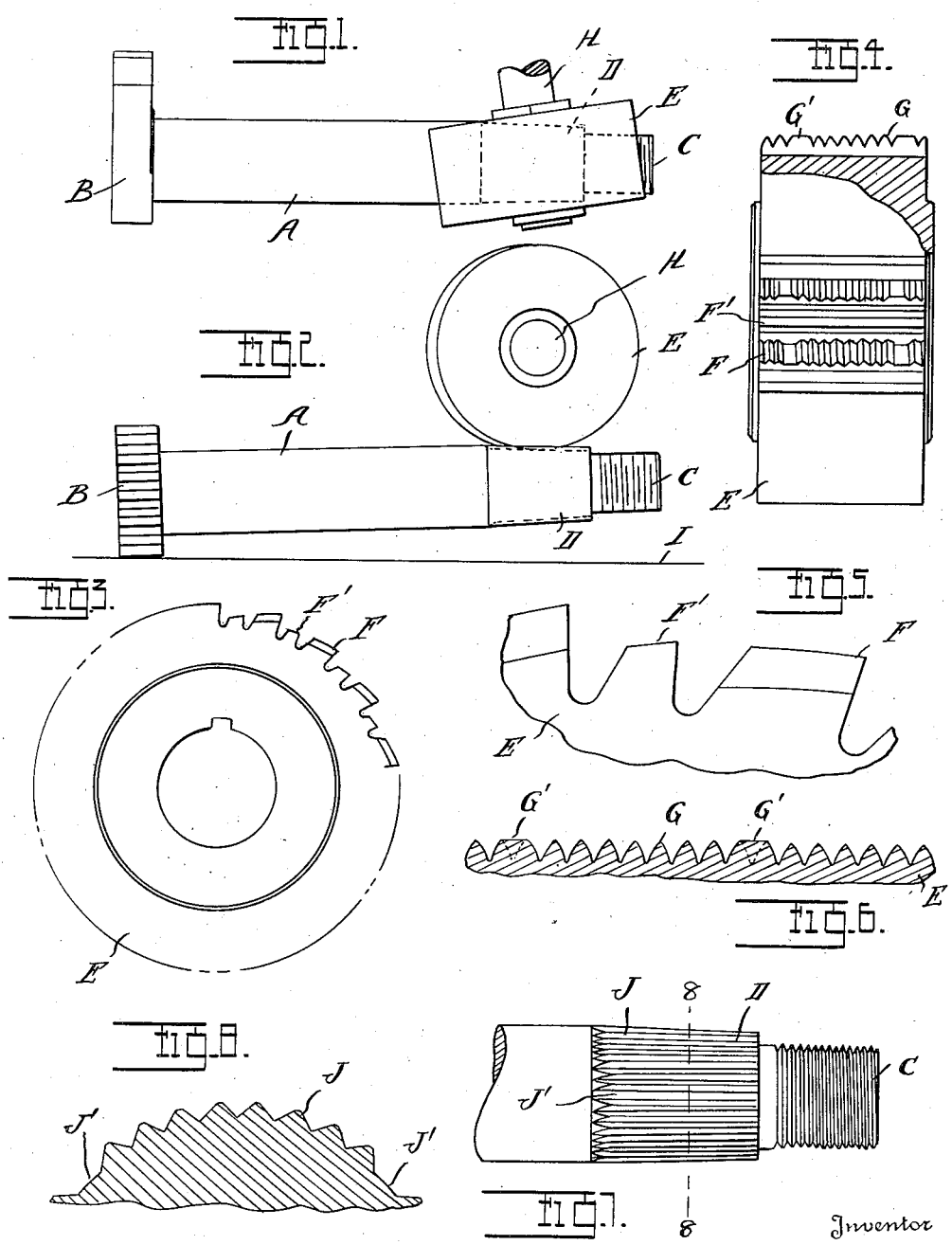

1,998,665

UNITED STATES PATENT OFFICE 1,998,665

CUTTER

Richard Flury, Detroit, Mich., assignor to Gemmer Manufacturing Company, Detroit, Mich., a corporation of Michigan Application May 9, 1932, Serial No. 610,215

4 Claims. (Cl. 29—103)

The invention relates to the manufacture of tapered serrated shafts designed for nonrotative attachment to a surrounding member with a minimum reduction in cross section. In the present state of the art it is usual to form such members by first turning to the desired taper and subsequently cutting the longitudinally extending teeth or serrations in the tapered part. In order to properly locate the surrounding member upon the shaft these teeth or serrations are interrupted at one or more points to engage correspondingly fashioned portions in said surrounding member. This may be accomplished by omitting one tooth or serration at such points.

It is the object of the present invention to obtain a rotary tool which will simultaneously accomplish the tapering of the shaft, the cutting of the longitudinal teeth or serrations therein and the forming of the interruptions at the desired locations. To this end the invention consists in the construction as hereinafter set forth.

In the drawing:

Figure 1 is a diagrammatic plan view and Figure 2 a side elevation showing the arrangement of the rotary cutter in relation to the work;

Figure 3 is an end elevation of the cutter;

Figure 4 is a side elevation thereof partly in section;

Figure 5 is an enlarged view of a portion of Figure 3;

Figure 6 is an enlarged cross section showing the form of the cutter blade;

Figure 7 is a side elevation of the completed product and

Figure 8 is an enlarged cross section on line 8—8 of Figure 7.

My improved tool may be used in any milling machine or other machine capable of rotatively supporting the work in proper angular relation to the tool and for imparting the desired relative movements to the tool and work. As diagrammatically illustrated in Figures 1 and 2, A is the work which specifically is the rock shaft of an automobile steering gear provided at one end with a worm gear segment B. At the opposite end of this shaft is a threaded shank C and between this portion and the body of the shaft is the portion D to be tapered and serrated. The tool E is in the form of a rotary milling cutter having a series of transversely extending notched blades F, the notches of which form in the periphery of the cutter a multiple helical thread. This thread G as shown in Figure 6 has grooves omitted at certain intervals as indicated at G' to form a truncated tooth of double width. The tool is further provided with straight edged transversely extending cutting blades F' intermediate one or more pairs of notched blades, and being preferably straight edged blades alternating with the tooth blades. The straight edge is located to be substantially in the path of the bottoms of the grooves in the notched blades or what would correspond to the outer apices of the serrations in the work.

The tool E thus constructed is placed upon the arbor H of the milling machine and the work shaft A is supported on the traveling table of the machine so as to have its axis parallel to the helical thread of the cutter. Also as shown in Figure 2 the axis of the work shaft A is inclined in the plane of rotation of the cutter to be at an angle to the direction of travel of the carriage which latter is indicated by the line I. This angle corresponds to the desired taper which is to be imparted to the serrated section D.

In the performance of the work the shaft A and the arbor H are rotated in timed relation to each other so that the cutter will operate as a hob. The work is then moved with the table I towards the cutter E with the result that a series of teeth or serrations J are formed with grooves J' of greater width at certain intervals. The cutter F will cut the teeth or serrations D and the straight edged blades F' will remove the stock which is radially outward beyond the apices of these serrations. By reason of the angular position of the shaft in the plane of the cutter, the teeth or serrations will be tapered longitudinally of the shaft and the double width truncated teeth G' of the cutter will form the locating grooves at suitable points such as at 90° from each other.

The combination of the straight edged blades with the notched blades is of great advantage in that, first, it removes the stock beyond the teeth or serrations in the deep portions of the cut and second, that it slightly flattens the apices of said teeth or serrations forming lands for engaging the member to be placed on the shaft.

What I claim as my invention is:

1. A rotary cutter for forming longitudinally tapered teeth or serrations on cylindrical members comprising a series of blades parallel to the axis of rotation, the cutting edges of certain of said blades being provided with uniformly spaced serrations and one or more serrations of multiple width, the corresponding serrations in successive blades forming helical curves and certain of said blades being straight-edged with the radius of this edge substantially the same as that of the bottoms of the serrations.

2. A rotary cutter for forming longitudinally tapered teeth or serrations on cylindrical members comprising a series of blades parallel to the axis of rotation, the cutting edges of certain of said blades being provided with uniformly spaced serrations and one or more double spaced serrations, the corresponding serrations in successive blades forming helical curves, and certain of said blades being straight-edged with the radius of this edge substantially the same as the bottoms of the serrations.

3. A rotary cutter for forming longitudinally tapered teeth or serrations on cylindrical members comprising a series of blades parallel to the axis of rotation, the cutting edges of said blades being alternately straight-edged and serrated, certain of the serrations being uniformly spaced and one or more multiple spaced, the radius of the cutting edge of said straight blades being substantially that of the bottom of said serrations.

4. A rotary cutter for forming longitudinally tapered teeth or serrations on cylindrical members comprising a series of blades distributed about the axis of rotation, certain of said blades having their cutting edges lying in a cylindrical surface of revolution and certain of said blades having cutting edges with uniformly spaced serrations therein and one or more serrations a multiple of the uniform spacing, the radius of the bottoms of said serrations lying substantially in said cylindrical surface of revolution.

RICHARD FLURY.